United States Patent Office 3,017,365
Patented Jan. 16, 1962

3,017,365
PHOSPHOR SUSPENSION
Don E. Harrison, East Cleveland, Ohio, assignor to General Electric Company, a corporation of New York
No Drawing. Filed Sept. 21, 1959, Ser. No. 841,020
2 Claims. (Cl. 252—301.3)

My invention relates generally to phosphor suspensions for application to a base such as the surface of a fluorescent lamp envelope.

For many years the tubular glass envelopes of fluorescent lamps have been coated with powdered phosphors by suspending the phosphors in a solution of a cellulosic binder, such as nitrocellulose or ethyl cellulose in suitable solvents, flushing the suspension over the interior surface of the envelope, and then drying and firing the coated envelope to burn off the binder. More recently there has come into use a suspension of the phosphor in water and a suitable water-soluble binder which possesses certain distinct advantages such as low cost, nontoxicity and non-flammability.

In spite of the advantages of water binders, certain phosphors are unsuitable for use therewith because of their partial solubility in water. Among those phosphors is a so-called titanium-activated barium pyrophosphate having a stated composition in the range of $2Ba_2P_2O_7:0.5$ to $2.5$ $TiO_2$ with a preferred composition of $2Ba_2P_2O_7:1.0TiO_2$ and fluorescing with a blue color. When such a phosphor is suspended in a solution of a water binder, the binder reacts with barium ions to form insoluble salts which precipitate from solution so that the solution loses the required viscosity to support the phosphor powder.

However, in accordance with a principal object of this invention, I have discovered that, when properly prepared, a barium-titanium-phosphate phosphor may be employed successfully in a water binder.

In accordance with the present invention, I have discovered that in the system $BaO$—$TiO_2$—$P_2O_5$, it is the compound $2BaO:TiO_2:P_2O_5$ which is responsible for the blue colored fluorescence, and that commercial phosphor compositions, such as $2Ba_2P_2O_7:1.0–1.3TiO_2$, consist of two phases $2BaO:P_2O_5$ and $2BaO:TiO_2:P_2O_5$. Thus, the heretofore preferred phosphor composition $$2Ba_2P_2O_7:1.0TiO_2$$

is actually a mixture of 50 mole percent $2BaO:TiO_2:P_2O_5$ and 50 mole percent $2BaO:P_2O_5$. I have further discovered that, fortuitously, the fluorescent compound $2BaO:TiO_2:P_2O_5$ is insoluble in water whereas the non-fluorescent compound $2BaO:P_2O_5$ is somewhat soluble in water. Thus, a phosphor composed of both those compounds is not stable in water binder because of the solubility of the latter compound and consequent reaction with the water binder whereas the fluorescent compound $2BaO:TiO_2:P_2O_5$ free from $2BaO:P_2O_5$ is stable in water binder.

Composition located near (around) the $$2BaO:TiO_2:P_2O_5$$

compound composition may contain either $$4BaO:3TiO_2:P_2O_5$$

$BaO:TiO_2:P_2O_5$ or $TiO_2$ in addition to $2Ba:TiO_2:P_2O_5$ and $2BaO:P_2O_5$. Such compounds are to be avoided since they have high ultraviolet absorption and are non-fluorescent phases, and therefore adversely affect the brightness of the phosphor.

The reaction involved in the preparation of the phosphor is a difficult one because of the low reactivity of $TiO_2$. It is therefore possible to employ the starting or batch materials in proper proportions to yield the compound $2BaO:TiO_2:P_2O_5$ and yet, due to failure to completely react the materials even with prolonged firing, actually achieve a mixture of that compound with excess $2BaO:P_2O_5$ and $TiO_2$.

In order to prepare the phosphor in a reasonable length of time, it is necessary to use a flux. For that purpose, use may be made of a completely volatile flux such as ammonium bifluoride or steam or HCl, or other flux which does not leave a residue of $BaO$ or $P_2O_5$ or $TiO_2$. On the other hand, good results are obtained with a flux such as $BaF_2$. However, in that case it is necessary to compensate with $P_2O_5$ for the $BaO$ resulting from the oxidation of $BaF_2$ in order to arrive at the desired composition $$2BaO:TiO_2:P_2O_5$$

A particularly effective way of adding the required $P_2O_5$ is by the use of $BaO:P_2O_5$. Conveniently, this compound melts at about 843° C. into a stable liquid. Since phosphor synthesis proceeds readily at temperatures of about 900–1000° C., liquid $BaO:P_2O_5$ acts as a flux as well as to control the final composition.

When employing a volatile flux, the phosphor may be prepared by mixing a small amount of the flux with 2 mols $BaHPO_4$ and 1 mol $TiO_2$, firing at 900° C. for 4 hours in covered trays, followed by milling of the phosphor and then a second firing at 1000° C. for 4 hours in open trays.

When employing the $BaF_2$ flux, the batch composition may consist of 1.86 moles $BaHPO_4$ (79.36% by weight), 0.070 mol $BaF_2$ (2.25% by weight), 0.070 mol $BaP_2O_6$ (3.78% by weight) and 1.0 mol $TiO_2$ (14.61% by weight), which may be fired, as before, in two steps at 900° C. and 1000° C. respectively for four hours each.

For forming aqueous suspensions for coating fluorescent envelopes, there are available water-soluble materials capable of giving at least a moderately viscous solution and which, when burned, leave only a small or no residual ash. Among such materials are polyacrylic acid, salts of alginic acid (Patent 2,676,894, Anderson et al.), water-soluble cellulose derivatives such as carboxymethyl cellulose (Patent 2,824,814, Jones et al.) and a copolymer of vinyl methyl ether and maleic anhydride (application Serial No. 625,942, W. C. Martyny et al., filed December 3, 1956, now U.S. Patent No. 2,987,414, and assigned to the same assignee as the present case), the disclosures of said patents and application being incorporated herein by reference.

By way of example, a binder solution may be prepared containing 0.5% by weight carboxymethyl cellulose and 99.5% by weight water. A suspension may then be prepared by mixing 1 kilogram of the phosphor compound $2BaO:TiO_2:P_2O_5$ with 800 ml. of the binder solution and ball milling to the desired particle size range of the phosphor. The charge may then be diluted by the addition of 700 ml. of the binder solution plus an amount of water necessary to achieve the desired coating thickness. The suspension is then flushed onto the interior surface of the glass lamp envelope, dried, and then baked at a temperature of about 500–600° C. for a few minutes in an oxidizing atmosphere to dispel the binder.

The phosphor may also be suspended in a binder solution of water, ammonium hydroxide and a copolymer of vinyl methyl ether and maleic anhydride in proportions of about 2000 to 3000 parts by weight of the phosphor, 1000 to 5000 parts by weight water, 9 to 100 parts by weight ammonium hydroxide and 9 to 40 parts by weight of the said copolymer. More specifically, the proportions, by weight, may be about 3000 parts phosphor, 3000 parts water, 20 parts concentrated ammonium hydroxide and 15 parts of the said copolymer. The suspension as applied to the glass envelope, dried and baked at about 500–600° C. to burn out the binder.

It will be evident that, when desired, the phosphor may be mixed in the suspension with other phosphors which are not adversely affected by water, in order to achieve a desired color rendition.

What I claim as new and desire to secure by Letters Patent of the United States is:

1. A phosphor suspension for application to a base member and consisting essentially of an aqueous solution of a water-soluble organic binder, said solution being free of soluble barium ions and containing in suspension a finely-divided water-insoluble barium-titanium-phosphate phosphor consisting essentially of the compound $$2BaO:TiO_2:P_2O_5$$

2. A phosphor suspension for application to a base member and consisting of an aqueous solution of a water-soluble organic binder which reacts with barium ions to form insoluble salts, said solution being free from soluble barium ions and containing in suspension a finely divided water-insoluble barium-itanium-phosphate phosphor consisting essentially of the compound $$2BaO:TiO_2:P_2O_5$$

and which is essentially free from soluble barium ions.

References Cited in the file of this patent
UNITED STATES PATENTS

| | | |
|---|---|---|
| 2,596,509 | Ranby | May 13, 1952 |
| 2,824,814 | Jones et al. | Feb. 25, 1958 |